Nov. 3, 1953 J. J. ZIMMERMANN 2,658,107

TELEPHONE ANSWERING AND MESSAGE RECORDING DEVICE

Filed Sept. 26, 1949 2 Sheets-Sheet 1

Joseph J. Zimmermann
INVENTOR.

BY Andrus & Sceales
ATTORNEYS.

Joseph J. Zimmermann
INVENTOR.

BY Andrus & Sceales
ATTORNEYS.

Patented Nov. 3, 1953

2,658,107

UNITED STATES PATENT OFFICE 2,658,107

TELEPHONE ANSWERING AND MESSAGE RECORDING DEVICE

Joseph J. Zimmermann, Milwaukee, Wis., assignor to The Electronic Secretary, Inc., Milwaukee, Wis., a corporation of Wisconsin Application September 26, 1949, Serial No. 117,759

15 Claims. (Cl. 179—6)

This invention relates to a device for automatically answering a telephone and recording incoming messages.

The present application constitutes a continuation in part of the application Serial No. 73,129 filed January 27, 1949 by the present inventor for Telephone Recording Devices.

A principal object of the invention is to provide a telephone answering and message recording device which is equipped with safety switches to insure reliability and prevent the possibility of interference with the telephone system.

Another object of the invention is to provide a telephone answering and message recording device having an improved actuating means.

Another object of the invention is to provide a telephone answering and message recording device which has an improved means for recording incoming messages.

Another object of the invention is to provide a telephone answering and message recording device which may be constructed from standard parts, thereby minimizing the cost of manufacture.

These and other objects and advantages of the invention will be set forth more fully in the following description of the invention as illustrated in the accompanying drawings.

Figure 1:
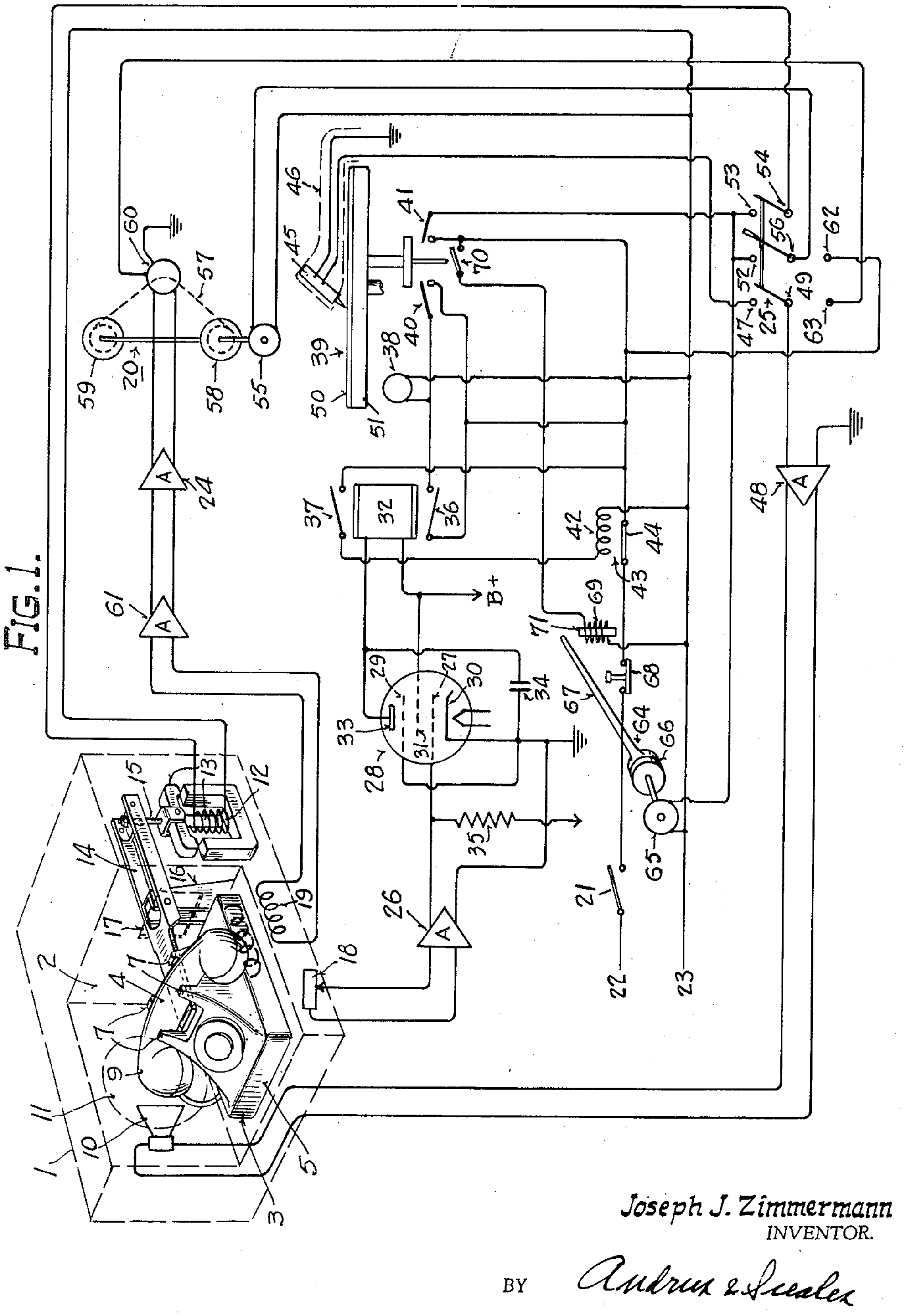
Figure 1 is a complete diagram illustrating a preferred form of the invention.
Figures 2, 3, 4:
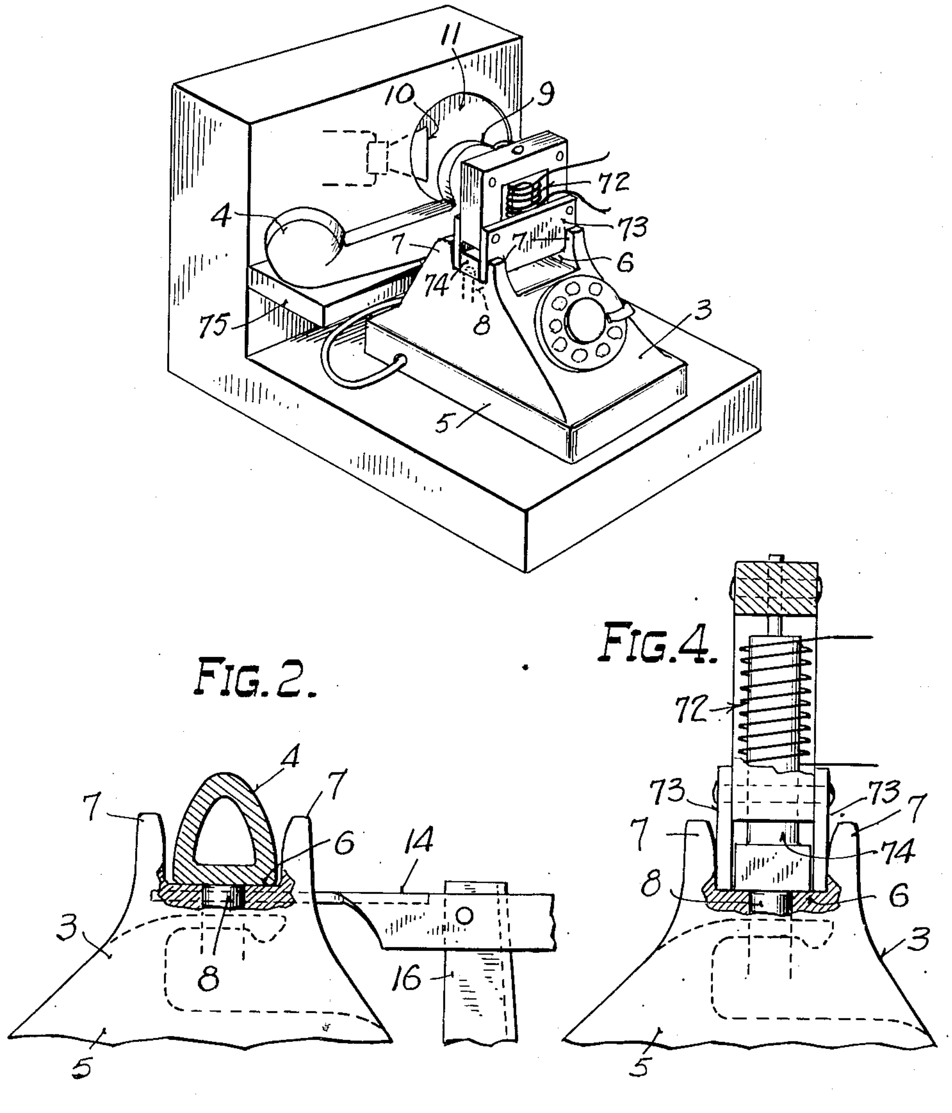
Fig. 2 is a side elevation of the handset, lifting arm, and top part of the base unit of Fig. 1, with portions broken away and sectioned.
Fig. 3 is a partial diagram illustrating a modified form of the invention in which the lifting arm and solenoid of Fig. 1 are replaced by a solenoid which rests on the telephone base unit during automatic operation.
Fig. 4 is a side elevation of the solenoid and top part of the base unit of Fig. 3, with portions broken away and sectioned.

According to the invention as illustrated in Figs. 1 and 2, a rectangularly shaped casing 1 is provided with a recess 2 in an upper corner thereof to support and partially encompass a telephone 3. The telephone 3 may be of any common variety, but is shown in the drawings as a modern desk stand type having a handset 4 and base unit 5. The handset 4 rests on two raised ridges 6 between two pairs of upwardly extending ears 7 which tend to prevent the handset 4 from slipping off the ridges 6. The ridges 6 contain two vertically movable buttons 8 which operate the telephone switching mechanism in such a way that the telephone 3 will be disconnected when the handset 4 is resting on the ridges 6 and depressing the buttons 8 but will be connected when the handset 4 is removed from the ridges 6.

In carrying out the invention the telephone 3 is placed in the recess 2 so that the transmitting end 9 of the handset 4 is adjacent a loudspeaker 10 arranged in the rear wall of the casing 1. An aperture 11 in the casing 1 permits sound waves originating in the loudspeaker 10 to reach the transmitter 9.

A lifting solenoid and lever arm mechanism is arranged in the right wall of the casing 1. The mechanism comprises a solenoid 12, a vertically movable solenoid core 13, a laterally extending lever arm 14, and a linkage 15 which connects the core 13 to one end of the lever arm 14. The lever arm 14 is pivoted on a support 16, from which it extends through an aperture 17 in the casing 1 and into the space subjacent the handset 4 and between the raised ridges 6. The lifting mechanism is adapted so that when the solenoid 12 is energized, the solenoid core 13 will move downwardly, thereby causing the lever arm 14 to pivot on the support 16 and elevate the handset 4. The raising of the handset 4 permits the buttons 8 to move upwardly and connect the telephone 3. In its elevated position the underside of the handset 4 is such a slight distance above the buttons 8 that the ears 7 remain effective in preventing the handset 4 from sliding out of position. De-energization of the solenoid 12 causes the handset 4 to fall back into position, which depresses the buttons 8 and disconnects the telephone 3.

A crystal microphone 18 is arranged in the casing 1 subjacent the telephone 3 to pick up the ringing of the telephone 3 and initiate actuation of the device in a manner which will subsequently be described.

A sensitive coil 19 disposed in the casing 1 subjacent the telephone 3 is adapted to be energized by induction from the telephone receiving coil located in the base unit 5 of the telephone 3. Incoming telephone messages in the form of electrical impulses will thus be reproduced, for purposes of recording, in the coil 19. The recording of incoming telephone messages in this manner, instead of by placing a microphone adjacent the telephone earpiece, greatly improves the quality of the records made.

The loudspeaker 10, the lifting solenoid 12, the crystal microphone 18 and the coil 19 are connected electrically to elements disposed in two other casings. One of these casings contains a wire recorder 20 of the type normally used for dictation purposes, and the other casing contains phonograph, amplification, and circuit control elements. For purposes of convenience neither of these casings is shown in the drawings, the elements disposed therein being illustrated schematically. It is preferable that the wire recorder rest on the phonograph, amplification, and circuit control casing and that both be located at some convenient place a few feet away from the casing 1. This minimizes undesirable interaction between the various elements and affords the greatest convenience for the operator of the device.

A master switch 21 controls the energization of the device by 110 volt supply lines 22 and 23. An ordinary rectifying power supply unit, which is not shown in the drawings, is adapted to heat the various vacuum tubes and apply the proper direct voltages to the vacuum tube elements.

The wire recorder 20 is a separate unit having its own power supply, which is not shown in the drawings, and its own amplifier 24. The closing of switch 21, therefore, operates to energize all vacuum tubes except those connected with the wire recorder power supply and amplifier 24. The reason for this varied degree of vacuum tube energization is that the tubes in the wire recorder 20 have sufficient warm-up time before a recording is made, whereas the other tubes must be ready for immediate operation.

A triple pole double throw switch 25 is arranged to connect the device for automatic operation when it is closed to the top terminals, and for playback when it is closed to the bottom terminals. The detailed operation of this switch and the associated circuits will be described subsequently.

The crystal microphone 18 is connected to the input side of a suitable amplifier 26, the output side of which is connected between the control grid 27 of a pentode trigger tube 28 and ground. The suppressor grid 29 of pentode 28 is connected to the cathode 30, and the screen grid 31 is connected through the coil of a relay 32 to the plate 33. The cathode 30 and the suppressor grid 29 are grounded and are also connected through a condenser 34 to the plate 33. A positive voltage is impressed on the plate 33 and the screen grid 31, whereas a negative bias is impressed on the control grid 27 via a resistor 35. The characteristics of the pentode 28 and the described circuit, which is known as a trigger circuit, are such that no plate current flows except during the period when the negative bias on the control grid 27 is counteracted by positive voltage impulses originating in the crystal microphone 18. During this period the amount of plate current changes from zero to maximum, thereby energizing the relay 32 and causing it to close its contacts 36 and 37.

Contact 36 is arranged to connect the motor 38 of a phonograph 39 across supply lines 22 and 23. The automatic turntable mechanism of the phonograph 39 is described in U. S. Patent No. 2,394,539 dated February 12, 1946. A retractable pin, which constitutes part of a clutch device described in the referred to patent, is used in the present invention as a means for actuating two low pressure switches or switch blades 40 and 41 fastened to the underside of the turntable mechanism. Switches 40 and 41, which are preferably blades of a single low pressure snap action switch, are adapted to be open when the retractable pin is in its elevated position and closed when the pin is in its depressed position. In this manner the closing of contact 36, which actuates the phonograph motor 38 and thus the turntable mechanism, operates to close the switches 40 and 41.

Contact 37 of relay 32 operates to connect the heating coil 42 of a normally closed thermal safety switch 43 across supply lines 22 and 23. The heating coil 42 heats a bimetallic arm 44 during the interval when the flow of plate current in pentode 28 maintains contact 37 in a closed position. The bimetallic arm 44 is constructed so that it will bend when sufficiently heated and open the switch 43, which is arranged in line 22. Switch 43 is adapted to remain closed unless a breakdown of plate current in pentode 28 has caused heating of abnormal duration. Since switch 43 is of a type which must be manually reclosed after it has opened, recurrent operation of the device due to a breakdown of plate current in pentode 28 is prevented.

Switch 40 is connected to bypass the contact 36 of relay 32, so that when switch 40 is closed energization of the phonograph motor 38 by supply lines 22 and 23 is independent of the relay 32. The phonograph pickup 45 arranged in the tone arm 46 of the phonograph 39 is connected between a terminal 47 of the triple pole double throw switch 25 and ground. The input side of an amplifier 48 is connected between pole 49 of switch 25 and ground, while the output side of amplifier 48 is connected to the loudspeaker 10. When switch 25 is closed to the top, therefore, a circuit comprising pickup 45, amplifier 48, and loudspeaker 10 is completed. A record 50 is positioned on the turntable 51 of phonograph 39. The outer edge of record 50 contains a band of the ordinary closely spaced spiral groove portions, having recorded thereon two messages separated by an interval of silence. The first message informs the person making an incoming call that the device is in operation and that a wire recording may be made if desired. The second message informs the caller that his time is up. The intervening period of silence operates to determine the length of the wire recording interval. The portion of the record 50 encompassed by the closely spaced recording groove portions is adapted with widely separated terminal groove portions to bring the tone arm 46 rapidly to the center of the record 50 upon completion of delivery of the second message. The movement of the tone arm 46 to the center of the record 50 results in the elevation of the retractable pin described in the referred to patent, thereby causing the opening of the switches 40 and 41 and the shutting off of the device.

The switch 41, which is actuated as previously described in the same way as switch 40, is connected between line 22 and terminals 52 and 53 of switch 25. Solenoid 12 is connected between a pole 54 of switch 25 and line 23. Solenoid 12, therefore, is energized when switch 25 is closed to the top and switch 41 is closed.

The wire recorder motor 55 and the wire recorder power supply, which is not shown in the drawings, are connected between pole 56 of switch 25 and line 23. A circuit comprising line 22, switch 41, terminal 52, pole 56, the wire recorder motor 55 and power supply, and line 23 is therefore completed when switch 41 is closed and switch 25 is closed to the top. The motor 55 is adapted to drive a record wire 57 wound on two spools 58 and 59 through the electromagnetic recording head 60 of wire recorder 20. The coil 19 is connected through a pre-amplifier 61 and the wire recorder amplifier 24 to the input of recording head 60, so that incoming telephone messages reproduced in the coil 19, as previously described, may be recorded on the record wire 57.

The wire recorder 20 may be connected for playback by closing switch 25 to the bottom. The wire recorder motor 55 and power supply are then energized by a closed power circuit comprising line 22, a terminal 62 of switch 25, pole 56 of switch 25, the wire recorder motor 55 and power supply, and line 23. The output of the recording head 60 is then connected via a terminal 63 of switch 25, pole 49 of switch 25, ground, and amplifier 48 to the loudspeaker 10. The same amplifier 48 and loudspeaker 10 are thus used to answer the telephone 3 and to play back recorded messages.

Continuous operation of the device in the event a broken record or other cause prevents the tone arm 46 of phonograph 39 from moving to the center of the record 50 and shutting off the device is prevented by a timing mechanism 64 connected across supply lines 22 and 23 in series with switch 41. The timing mechanism 64 comprises a synchronous motor 65 geared through a friction clutch 66 to an arm 67. A normally closed button switch 68 is arranged in line 22 to open the same when actuated by the downwardly rotating arm 67. The gear ratio between arm 67 and the synchronous motor 65 is such that the arm 67 will not reach switch 68 during normal operation. Operation over an abnormally long period, however, will cause the arm 67 to contact switch 68, thereby opening line 22 and shutting off the device.

A solenoid 69 in series with a roller switch 70 is connected across supply lines 22 and 23. The roller switch 70 is closed momentarily at the beginning and end of each cycle of operation by the movement of the retractable pin described in the referred to patent. The closing of switch 70 energizes solenoid 69 and causes it to momentarily attract its core 71, which is adapted to contact and reset the arm 67 by backslipping the friction clutch 66.

The operation of the telephone answering and message recording device illustrated in Fig. 1 is as follows:

Assume that the device is set for automatic operation by closing the master switch 21 and by closing switch 25 to the top. This, as previously described, energizes all power circuits and vacuum tubes except those in the wire recorder 20.

The ringing sound made by the bell of the telephone 3 to announce an incoming call is converted to electrical current by the crystal microphone 18. This current is amplified in amplifier 26 and used to counteract the negative bias on the control grid 27 of the pentode trigger tube 28, thereby causing the maximum plate current to flow. This maximum plate current energizes the relay 32 and causes it to close its contacts 36 and 37 and maintain them in a closed position during each ring of the telephone bell.

The closing of contact 36 operates to start the motor 38 of phonograph 39 and cause it to continue running for the duration of each ring of the telephone bell. After the motor 38 has run during several rings, the retractable pin described in the referred to patent will move from its elevated to its depressed position, thereby closing the low pressure switches 40 and 41.

The closing of switch 40 completes a bypass circuit which makes the energization of the phonograph motor 38 independent of the contact 36 of relay 32. The phonograph 39 will then run its cycle, with the tone arm 46 and pickup 45 moving slowly toward the center of the record 50 and playing the recorded messages into the loudspeaker 10 via amplifier 48.

The closing of switch 41 operates to energize the solenoid 12, the wire recorder 20, and the timing mechanism 64. The energization of solenoid 12 causes it to attract its core 13 and actuate the lever arm 14, which raises the handset 4 off the raised ridges 6 and buttons 8. The telephone 3 is thus connected and the recorded messages emanating from the loudspeaker 10 are transmitted by the adjacent transmitting end 9 of the telephone handset 4.

The energization of the wire recorder 20 causes the wire recorder motor 55 to drive the record wire 57 through the recording head 60. Incoming telephone messages which are induced from the receiving coil of the telephone 3 into coil 19 and amplified in amplifiers 61 and 24 may then be recorded by the recording head 60 on the record wire 57. This recording of incoming messages takes place during the interval of silence which separates the two messages recorded on the phonograph record 50.

The movement of the phonograph tone arm 46 to the center of the record 50 upon completion of the second recorded message causes actuation of the retractable pin described in the referred to patent, which opens switches 40 and 41 and shuts off the device. The solenoid 12 is thus de-energized, causing the handset 4 to fall back into place and disconnect the telephone 3. The residual motion of the turntable 51 operates, in the manner described in the referred to patent, to elevate the tone arm 46 and move the same to the outer edge of the record 50. The phonograph 39 is thus prepared to repeat its cycle upon commencement of another telephone call.

Continuous operation of the device, which would result if the tone arm 46 failed to cause the opening of switches 40 and 41, is prevented by the timing mechanism 64. Operation of the device over an abnormally long period of time will cause the downwardly rotating arm 67, which is driven by synchronous motor 65, to contact and open the button switch 68, thereby shutting off the device. The arm 67 is reset at the beginning and end of each cycle of operation by the upward movement of the core 71 of solenoid 69. The momentary energization of solenoid 69 upon closing of roller switch 70, which is actuated by the referred to retractable pin, causes it to attract core 71 upwardly. Core 71 thus "kicks" arm 67, causing it to backslip on friction clutch 66 back to starting position.

A breakdown of plate current in pentode 28 would cause the contacts 36 and 37 of relay 32 to remain closed indefinitely, instead of opening as is desired at the end of each ring of the telephone bell. This would cause the device to continuously connect and disconnect the telephone 3 although no incoming telephone call was being made. The possibility of this undesirable operation is eliminated by the thermal safety switch 43, which opens when sufficiently heated and shuts off the device. The bimetallic arm 44 is heated by coil 42 during the interval when contact 37 of relay 32 remains closed. Since contact 37 normally remains closed only for the duration of each ring of the telephone bell, the bimetallic arm 44 is normally not heated sufficiently to cause it to open switch 43. If a breakdown of plate current causes contact 37 to remain closed for an abnormally long time, however, the heating of arm 44 will be sufficient to cause it to bend and open switch 43.

It will be noted that the telephone bell must ring several times before the phonograph motor 38 operates, by means of the turntable mechanism and retractable pin described in the referred to patent, to close switches 40 and 41. This delay is desirable, since it prevents the actuation of the device by voltage surges in the telephone line or by noises other than the telephone bell.

The device is connected for playback by closing switch 25 to the bottom. The wire recorder 20 is then energized directly from lines 22 and 23, and the output of the recording head 60 is connected to the loudspeaker 10 via amplifier 48. The messages recorded on the record wire 57 during automatic operation may thus be played back to the operator of the device.

The described device may be used to merely answer the telephone, the message recording function being omitted. To do this, the operator merely disconnects the wire recorder 20 and places a different record on the turntable 51. This record may instruct the caller to call another number, or at a later time, etc.

The wire recorder 20 may be used for dictation purposes by merely disconnecting the coil 19 and preamplifier 61 and replacing them with an ordinary microphone.

In the modified form of the invention illustrated by Figs. 3 and 4, the lifting solenoid and lever arm mechanism of Fig. 1 is replaced by a solenoid 72 adapted with plates 73 to rest on the raised ridges 6 of the telephone 3 after the handset 4 has been removed therefrom. The vertically movable core 74 of the solenoid 72 rests on the buttons 8, maintaining them in a depressed position. The energization of the solenoid 72 causes it to attract its core 74 upwardly, which allows the buttons 8 to assume their elevated position and connect the telephone 3. When the solenoid 72 is de-energized, the core 74 falls back into position and disconnects the telephone 3.

The solenoid 72 is connected in the same way as the solenoid 12 illustrated in Fig. 1. The handset 4 is placed on a support 75 with the transmitting end 9 adjacent the loudspeaker 10.

The operation of the modified form of the invention illustrated in Figs. 3 and 4, except with respect to the means for connecting and disconnecting the telephone 3, is the same as the operation described in connection with Fig. 1.

Various embodiments of the invention may be employed within the scope of the following claims.

I claim:

1. In an automatic telephone answering apparatus, a reproducer operably associated with a telephone to transmit a previously recorded message therethrough, means to close the talking circuit of said telephone to permit transmittal of said message, a relay responsive to an incoming telephone signal and connected with said reproducer and said circuit closing means to actuate the same upon receipt of said signal, and a safety device adapted to open said telephone talking circuit, said safety device being responsive to current flow in the circuit of said relay over a predetermined period of time other than the normal period of current flow therein to open said telephone talking circuit and thereby prevent interference with the telephone system in the event of abnormal operation of said relay.

2. In an automatic telephone answering apparatus, a source of electric current, a phonograph reproducer connected to said source of current, a record mounted on said reproducer and having a message recorded thereon, a loudspeaker connected to said reproducer and disposed adjacent a telephone for transmittal of said message therethrough, a solenoid connected to said source of current and adapted when energized to close the talking circuit of said telephone and when de-energized to open the same, a relay responsive to an incoming telephone signal and connected to control the flow of current from said current source to said reproducer and said solenoid to energize the same upon receipt of said signal, and a safety switch connected between said current source and said solenoid to de-energize said solenoid and open said telephone talking circuit, said safety switch being responsive to current flow in the circuit of said relay over a predetermined period of time longer than the normal period of current flow therein to open said talking circuit and thereby prevent interference with the telephone system in the event of abnormally protracted operation of said relay.

3. In an automatic telephone answering apparatus, a phonograph reproducer operably associated with a telephone to transmit a previously recorded message therethrough, means to close the talking circuit of said telephone to permit transmittal of said message, a detector disposed adjacent said telephone and connected to the control grid of a pentode trigger tube to counteract a negative bias on said grid and permit the flow of plate current in said tube during actuation of said detector by the ringing signal of said telephone, and a relay coil connected in the plate circuit of said trigger tube for energization thereby during the period of plate current flow, said relay coil having a contact connected to actuate said reproducer and said circuit closing means and initiate a cycle of operation whereby said recorded message is transmitted over said telephone.

4. In an automatic telephone answering apparatus, a phonograph reproducer operably associated with a telephone to transmit a previously recorded message therethrough, means to close the talking circuit of said telephone to permit transmittal of said message and to subsequently open said circuit upon completion of a cycle of operation of said apparatus, a detector mounted in contiguous relation with said telephone and connected to the control grid of a trigger tube, said grid being provided with a negative bias sufficient to prevent the flow of plate current in said tube except during intervals when said negative bias is counteracted by positive voltage impulses from said detector during ringing of the signal of said telephone, a relay coil connected in the plate circuit of said trigger tube for energization during periods of plate current flow, contact means responsive to energization of said relay coil and connected to actuate said reproducer and said talking circuit closing and opening means to initiate a cycle of operation thereof, and a safety timing device initiated by the energization of said relay coil and connected to open said talking circuit, said safety device being adjusted to cause opening of said talking circuit after a predetermined period of time longer than the normal ringing period of said telephone to prevent interference with the telephone system in the event of a breakdown of plate current in said trigger tube.

5. In a telephone answering device, a motor, a phonograph driven by said motor and adapted to reproduce a previously recorded message from a record, said phonograph having an automatic turntable mechanism to reset the phonograph tone arm after movement thereof to the center of said record, means associating said phonograph with a telephone to permit transmittal of said message thereover, electromagnetic means operable when energized to close the talking circuit of said telephone and when de-energized to open the same, a relay responsive to an incoming telephone signal and connected to said motor to cause energization thereof during the period of said signal, and a switch connected to control the energization of said motor and said electromagnetic means, said switch being mounted on said turntable mechanism and operated by the movements thereof to first cause energization of said electromagnetic means and continued energization of said motor and to subsequently effect de-energization of said electromagnetic means and motor upon movement of said tone arm to the center of said record after transmittal of the recorded message over said telephone.

6. In a telephone answering device, a motor, a phonograph driven by said motor and adapted to reproduce a previously recorded message from a record, said phonograph having an automatic turntable mechanism to reset the phonograph tone arm after movement thereof to the center of said record, means associating said phonograph with a telephone to permit transmittal of said message thereover, electromagnetic means operable when energized to close the talking circuit of said telephone and when deenergized to open the same, a relay responsive to an incoming telephone signal and connected to said motor to cause energization thereof during the period of said signal, a switch connected to control the energization of said motor and said electromagnetic means, said switch being mounted on said turntable mechanism and operated by the movements thereof to first cause energization of said electromagnetic means and continued energization of said motor and to subsequently effect de-energization of said electromagnetic means and motor upon movement of said tone arm to the center of said record after transmittal of the recorded message over said telephone, and a safety timing device connected to cause de-energization of said electromagnetic means and motor in the event of failure of operation of said switch due to sticking of said tone arm.

7. In an automatic telephone answering apparatus, a reproducer operably connected with a telephone to transmit a previously recorded message therethrough, means to close the talking circuit of said telephone to permit transmittal of said message, a relay responsive to an incoming telephone signal and connected with said reproducer and said circuit closing means to actuate the same upon receipt of said signal, means to open said talking circuit after transmittal of said message, a safety timing mechanism connected to said reproducer to open said talking circuit upon expiration of a predetermined period of time longer than the normal period of operation of said apparatus in the event of failure of operation of said last named means, and means to reset said timing mechanism to its original position to prepare the apparatus for a subsequent normal cyclic operation.

8. A device of the character described comprising a source of electric current, a phonograph reproducer connected to said source of current, a record mounted on said reproducer and having a message recorded thereon, a loudspeaker connected to said reproducer and disposed adjacent a telephone for transmittal of said message therethrough, a recorder energized by said source of current, an induction coil mounted adjacent said telephone and electrically connected with said recorder to pick up and record incoming telephone messages, a solenoid connected to said current source and adapted when energized to close the talking circuit of said telephone and when de-energized to open the same, a relay responsive to an incoming telephone signal and connected to control the flow of current from said current source to said reproducer, solenoid and recorder to actuate the same upon receipt of said signal, a first safety switch responsive to current flow in the circuit of said relay over a predetermined period of time longer than the normal period of current flow therein to de-energize said solenoid in the event of abnormally protracted operation of said relay, means to de-energize cycle of operation of said device, and a second safety switch operated by a timing mechanism to de-energize said solenoid at the expiration of a predetermined period of time longer than the normal period of operation of said device to open said telephone talking circuit in the event of a failure of operation of said last named means.

9. A device of the character described comprising a source of electric current, a phonograph reproducer connected to said source of current, a record mounted on said reproducer and having a message recorded thereon, a loudspeaker connected to said reproducer and disposed adjacent a telephone for transmittal of said message therethrough, a recorder energized by said source of current, an induction coil mounted adjacent said telephone and electrically connected with said recorder to pick up and record incoming telephone messages, a solenoid connected to said current source and adapted when energized to close the talking circuit of said telephone and when de-energized to open the same, a detector mounted in contiguous relation with said telephone and connected to the control grid of a trigger tube to counteract a negative bias on said grid and cause plate current to flow in said tube during actuation of said detector by the ringing signal of said telephone, a relay connected in the plate circuit of said trigger tube to actuate said reproducer, solenoid and recorder, means to de-energize said solenoid at the end of a predetermine cycle of operation of said device, and safety timing means to de-energize said solenoid in the event of abnormally protracted operation of said device to prevent interference with the telephone system with which the device is associated.

10. In an automatic telephone answering device adapted to be employed with a telephone having a base unit and a spring biased switch button projecting upwardly from said base unit for engagement with a handset normally associated therewith, a solenoid mounted on said base unit in the cradle normally occupied by said handset, a vertically movable solenoid core mounted in said solenoid above said switch button and having sufficient weight to depress said button against the spring bias thereof, said core resting normally in depressing engagement with said button to maintain the talking circuit of said telephone in opened condition and operable when elevated by said solenoid upon energization thereof to release said button and close said talking circuit, a phonograph reproducer operably associated with said handset to transmit a previously recorded message therethrough while said talking circuit is maintained in closed condition by energization of said solenoid, and a relay responsive to an incoming telephone signal and connected with said solenoid and reproducer to actuate the same upon receipt of said signal to initiate a cycle of operation whereby said recorded message is transmitted over said telephone.

11. In a device for answering a telephone and repeating thereover a previously recorded message from a record, a reproducer associated with said telephone for transmittal of said recorded message thereover, said reproducer comprising a pickup and an automatic mechanism to relatively reset said pickup and said record immediately after the repeating of said recorded message, means responsive to an incoming telephone signal to start the operation of said reproducer, a holding circuit electrically connected in circuit with said reproducer to continue operation of said reproducer after the incoming telephone signal discontinues, means responsive to the start of the reproducer to close said holding circuit for said reproducer, and to close the talking circuit of said telephone, and means to release said holding circuit and thereby shut off said reproducer and open said talking circuit, said last-mentioned means being responsive to the condition of said reproducer and record immediately subsequent to the repeating of said message to thereby render the period of operation of the device dependent upon the length of said recorded message.

12. In a device for answering a telephone and playing thereover a message recorded on the closely spaced groove portions of a phonograph record, a phonograph driven by an electric motor and associated with said telephone for transmittal of said recorded message thereover, said phonograph including a pickup and an automatic mechanism to reset said pickup to the starting point of said record after said message has been played and said pickup has been rapidly moved along terminal groove portions of said record to a predetermined end position, means responsive to an incoming telephone signal to start said phonograph, a holding circuit electrically connected in circuit with said phonograph to continue operation of said phonograph after the incoming telephone signal discontinues, and means responsive to the starting of said phonograph to close said holding circuit for operation of said phonograph and close the talking circuit of said telephone for transmittal of said message, and a switch connected to open said holding circuit to shut off said phonograph and open said talking circuit, said switch being responsive to the movement of said pickup to said predetermined end position to thereby render the period of operation of the device dependent upon the time taken by said pickup to traverse said closely spaced groove portions and play said message.

13. In a device for answering a telephone and playing thereover a message recorded on the closely spaced groove portions of a phonograph record, a phonograph driven by an electric motor and associated with said telephone for transmittal of said recorded message thereover, said phonograph including a pickup and an automatic mechanism to reset said pickup to the starting point of said record after said message has been played and said pickup has been rapidly moved along terminal groove portions of said record to a predetermined end position, means responsive to an incoming telephone signal to start said phonograph and close the talking circuit of said telephone for transmittal of said message, a switch responsive to the movement of said pickup to said predetermined end position and connected to shut off said phonograph and open said talking circuit, and a safety timing device connected to open said talking circuit after a predetermined interval longer than the normal period of operation of said device in the event the sticking of said pickup prevents the actuation of said switch.

14. In a telephone answering and message recording device adapted for use with a phonograph record comprising a plurality of closely spaced groove portions and a plurality of widely spaced groove portions, said closely spaced groove portions having recorded thereon a first message and a second message separated from said first message by an interval of silence; a recorder adapted to be associated with a telephone to record an incoming message, a phonograph adapted to be associated with said telephone to transmit said first and second recorded messages thereover, said phonograph including a pickup and an automatic mechanism to reset said pickup to the starting point of said record after the playing of both of said messages and the rapid movement of said pickup along said widely spaced groove portions to a predetermined end position, means responsive to incoming telephone signals to start said phonograph, a holding circuit electrically connected in circuit with said phonograph to continue operation of said phonograph after the incoming telephone signal discontinues, means responsive to the start of said phonograph to close said holding circuit to allow normal operation of said phonograph and to start said recorder and to close the talking circuit of said telephone, and a switch responsive to the movement of said pickup to said predetermined end position and connected to open said holding circuit and thereby shut off said phonograph and recorder and to open said talking circuit, whereby the duration of said interval of silence determines the length of the incoming message and the duration of the first and second recorded messages plus said interval of silence determines the period of operation of the device.

15. In an automatic telephone answering apparatus, a reproducer adapted to be associated with a telephone to transmit a previously recorded message therethrough, means to close the talking circuit of said telephone to permit transmittal of said message, means responsive to an incoming telephone signal and connected with said reproducer and said circuit closing means to actuate the same upon receipt of said signal, means to open said talking circuit after transmittal of said message, and a safety timing mechanism responsive to said reproducer to open said talking circuit in the event of failure of operation of said last named means, said timing mechanism including a motor driven arm and means to reset said arm to its starting position after the normal period of operation of the apparatus to prepare the same for a subsequent cycle of operation.

JOSEPH J. ZIMMERMANN.

References Cited in the file of this patent

UNITED STATES PATENTS

| Number | Name | Date |
|---|---|---|
| 1,973,081 | Keiser | Sept. 11, 1934 |
| 2,005,788 | Keiser | June 25, 1935 |
| 2,160,829 | Cherry | June 6, 1939 |
| 2,261,420 | Shively | Nov. 4, 1941 |
| 2,284,173 | Soukup et al. | May 26, 1942 |
| 2,380,799 | Shively et al. | July 31, 1945 |
| 2,441,840 | Petrushill | May 18, 1948 |
| 2,533,234 | Edwards | Dec. 12, 1950 |
| 2,539,139 | Jordanoff et al. | Jan. 23, 1951 |
| 2,549,548 | Von Zimmerman | Apr. 17, 1951 |

FOREIGN PATENTS

| Number | Country | Date |
|---|---|---|
| 461,626 | Great Britain | Feb. 19, 1937 |